May 5, 1959   V. F. ZAHODIAKIN   2,884,677
FASTENING DEVICE
Filed Feb. 26, 1954
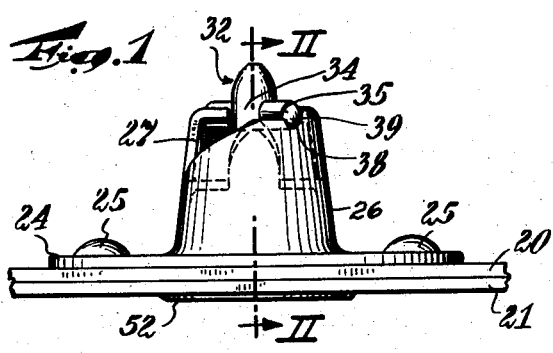
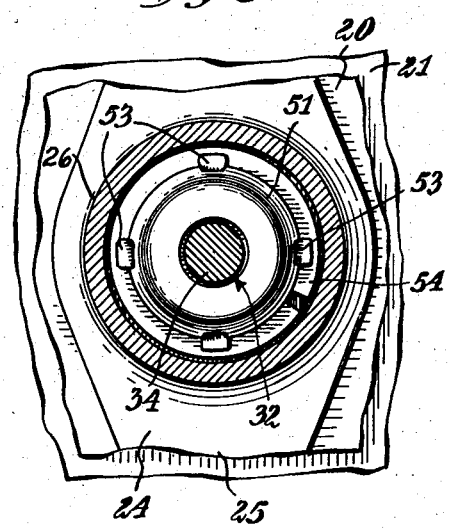
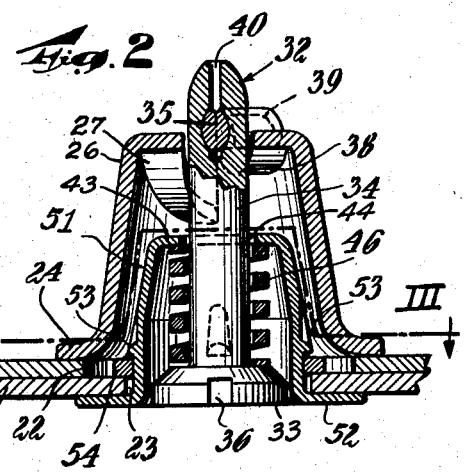
INVENTOR.
VICTOR F. ZAHODIAKIN.
BY
Howard P. King
ATTORNEY

United States Patent Office 2,884,677
Patented May 5, 1959

2,884,677

FASTENING DEVICE

Victor F. Zahodiakin, Summit, N.J.

Original application July 2, 1953, Serial No. 365,671, now Patent No. 2,684,516, dated July 27, 1954. Divided and this application February 26, 1954, Serial No. 412,722

3 Claims. (Cl. 24—221)

This application is a division of application Serial No. 365,671, filed July 2, 1953, issued as Patent 2,684,516 July 27, 1954, and the invention relates to a fastening device and more particularly to the rotary type thereof such as commonly employed in military and commercial aircraft and where a quick-operating fastening device is desirable, and has particular reference to a quick-locking stud and socket type of device wherein an interlock is obtained by engaging the stud with its socket by means of twisting the stud and thereby obtaining a compressive clamping of interposed panels or members and for accomplishing other similar uses, such as securing various brackets and other parts which it is desired to hold in juxtaposed position.

The invention contemplates provision of a structure of minimum weight and of minimum envelope size with a maximum strength and maximum hardness of working surfaces, and even though of minimum weight and size, one which is capable of sustaining maximum tensile forces and shear loads, and furthermore, a device which can be assembled or removed from the place of use without any special tools.

Amongst other objects contemplated by the invention, is to provide a precision construction and minimum multiplicity of parts enabling the device to attain and retain accuracy to close tolerances and to readily accommodate substitution of new parts when found necessary or desirable.

A further object of the invention is to eliminate the conventional groove for snap-ring retention, and thereby avoid extra thickness required for such a groove, and in this connection to provide an improved means for retaining the grommet and stud assembled with the member being clamped.

Other objects of the invention will become apparent to persons skilled in the art to which it appertains as the description proceeds, both by direct recitation thereof and by implication from the context.

Referring to the accompanying drawings, in which like numerals of reference indicate similar parts throughout the several views:

Figure 1 is a side elevation of the fastening device mounted in clamping position on members juxtaposed to each other and clamped thereby;

Figure 2 is a sectional view on line II—II of Fig. 1; and

Figure 3 is a cross section on line III—III of Fig. 2.

In the specific embodiment of the invention illustrated in said drawings, the reference numerals 20, 21 designate juxtaposed members adapted to be clamped together in overlapped position. For convenience in making distinguishing reference thereto, the members will be arbitrarily referred to as inner member 20 and outer member 21. The device of this invention is directed primarily to military aircraft of high speeds, such as jet planes, which are capable of sonic and supersonic speeds. In such planes the external panels or members must be made to fit very precisely and it is a present-day normal specification for the said panels or members not to project one over another to exceed .005" and in construction of such planes the fastening devices to meet army-navy specifications must withstand very severe tests requiring maximum tensile strength, maximum resistance to shear load, and still remain within limited requirements as to size, weight and other restrictions and limitations. Imposed limitations on the size of holes permitted in the members and as to projection of any part of the device beyond the outer surface of the member adds heavily to the problem. Furthermore, in view of the fact that some armed-forces planes use many thousands of the fastening devices per aeroplane, the weight thereof becomes a great factor and must be kept as low as possible consistent with provision of a strong, precision, and otherwise satisfactory construction.

The members to be secured are pre-punched with holes 22, 23 respectively, which are intended to axially register when the members are assembled, the hole 23 of the outer member, however, being smaller than the hole 22 in the inner member.

The socket element of the device is secured, as by a basal flange or face-plate 24 constituting an integral part thereof and by rivets 25, to inner member 20. Upstanding from said basal flange is a hollow body of revolution having a side wall 26 which may be entirely frusto-conical and attached through the agency of the basal flange and rivets substantially coaxial to the hole 22 of inner member 20.

The end of the hollow body side wall 26 remote from the basal flange, terminates with an end wall constituted as a pair of opposite and inwardly directed progressively advancing or sloping trackways 27 in a common direction of rotation. The bottom ends of these trackways are located on a common diameter somewhat below the upper end of the side wall 26. Each sloping trackway 27, as seen in plan, extends for substantially 180°, one opposite to the other and at the axial plane therebetween the starting end of one trackway is well below the finish end of the other trackway, providing ample space for a cross-pin, subsequently described, to pass therebetween.

It is now opportune to state that the socket element above-described is fabricated from sheet steel of uniform thickness by drawing, cutting and forming with appropriate dies, so that the completed socket element has the same thickness of material throughout. Exactitude of construction, dimensions, clearances and other specification requirements may consequently be fulfilled. The use of sheet steel makes it possible to case carburize the socket element approximately to a depth of .008" to .015" and then harden the same to a maximum surface hardness, leaving the portion of the metal buried under the hardened surface advantageously somewhat softer and resistive to cracking. As a result, the device is stronger with less metal than heretofore possible, and is much lighter in weight and resists wear for a useful life many times that of prior art devices. These several advantages are cumulative in production of a device far superior to any heretofore available.

Cooperative with the socket element is a stud element or assembly including a stud 32 having a head 33 and a shank 34, said stud having an over-all length enabling the same to extend from the outer surface level of the outer member 21 and through the entire length of the socket element. Near the upper end of the stud shank 34 there is a cross-pin 35 or other diametric projection adapted to engage upon and across said trackways 27 and ride up or down said trackways by appropriate rotation of the stud, for which purpose the stud head is shown provided with a kerf 36 for reception of a screw driver or other tool.

It is now convenient to call attention to the fact that the trackways 27 extend inwardly from the socket element side wall just far enough to leave a center passageway for the stud shank 34 which will be guided coaxially through the upper portion of the hollow body side wall by engagement with the inwardly directed edges of said trackways. Furthermore said trackways constitute in part the upper end of said side wall and in part overlie the thickness of said wall. The ends of the cross-pin 35 riding on the trackways exert almost direct pressure upon and longitudinally of said side wall.

At the upper end of each trackway there is a declivity 38 followed by an upwardly projecting stop 39 terminating said trackway. The declivities are of segmental cylindrical formation and the axis thereof is a true diameter of the socket element which will coincide with the axis of the cross-pin 35 when the cross-pin is in a seated position in said declivities. Said declivities 38 are axially open at both ends to permit free axial or longitudinal floating of the cross-pin when seating therein, thereby preventing the cross-pin from an axial misalignment and enabling it to nest at both projecting ends thereof in said declivities, as a consequence of which the axial load will be uniformly distributed on both ends of the cross-pin.

It is desirable that the cross-pin shall be permanently secured in the stud shank and be prevented from sliding with respect thereto. As one means for accomplishing this purpose, the stud shank 34 may have a hole 40 drilled longitudinally thereof to and past the location of the pin before the pin is applied. Then, after the cross-pin is properly placed, a center-punch or other tool may be introduced into said hole and the metal of the pin peened to create a burr or protrusion over the pin surface or other gripping action of the pin metal where crossing said hole 40.

A spring loading is provided for the stud, the primary purpose therefor being to retain the clamped members under constant predetermined tension and to retain the transverse projection or cross-pin 35 seated in said declivities 38 until intentionally released. In carrying out this feature of the invention, I provide a one-piece construction of grommet 51 having somewhat the shape of an inverted cup. The outside surface of the grommet is a concentric surface with the inside bore of the grommet. A hole 44 considerably larger than the diameter of stud 32 is provided centrally of this cross wall so that the stud may extend loosely therethrough and tilt or be tilted as required in service. The other end of the grommet 51 from said cross wall is entirely open, but has an external peripheral rim 52. When the device is placed in service, the hollow body side wall of the grommet is inserted, from the outside of the outer member 21 to be clamped, through hole 23 with which it has a reasonably free fit. Rim 52 then engages the margin of said member around the hole and retains the grommet from further inward displacement. If a dimple is not provided in the member being clamped, the underside of the rim 52 may be flat and engage the flat marginal surface of the member around the hole as shown.

A spring 46 is applied to and encircles the part of the stud within the grommet. It will be understood that the grommet 41 is assembled with the spring and the stud 32 before cross-pin 35 is introduced and that introduction of the cross-pin keeps the stud from becoming separated from the grommet. Said spring bears at one end against the under shoulder of the stud head 33 and bears at its othe rend against the cross-wall 43 of the grommet. The spring dimensions and action are sufficient to make the stud head protrude from the grommet when the stud is in its unlocked condition, and the protruding head gives positive indication that the device is not locked. However, the dimensions are made such that when the stud is rotated to advance the cross-pin 35 up the trackway 27 and into the declivities 38, the outer end of the stud head 33 will then be flush with the outer face of rim 52 and definitely indicate the device is locked.

As it is important that the stud element or assembly, which comprises stud 32, grommet 51 and spring 46, shall remain in place in member 23 even when unlocked, I provide a retainer 54 here shown as a split ring at the back side of said member and mounted on the grommet. The side wall of the grommet, at a proper location thereon, is swaged by a die and provides a plurality of shoulders 53 at intervals around the grommet spaced from and facing downwardly toward flange 52. Said split snap ring 54 can be slid over said shoulders from the smaller end of the grommet to snap under the shoulders and be held from retractive displacement thereby. The ring 54 overlies the margin of hole 23 of outer member 21, and being held by said shoulders, retains the grommet from dropping out of said hole when the device is unlocked.

I claim:

1. A fastening device of stud and socket type for juxtaposed members to be clamped thereby, comprising a stud element providing a stud and a grommet thereon, said grommet having a substantially cylindrical wall portion next to one end thereof and a frusto-conical wall portion continuing directly from said cylindrical wall portion to the other end of said grommet, and said grommet having an end wall bent inwardly from the small end of the frusto-conical wall making an interior angle of more than 90° with said frusto-conical wall, and means in the region of the junction of said cylindrical and frusto-conical wall portions for retaining said grommet in one of said juxtaposed members, said means being circumferentially spaced around said grommet and constituted by metal swaged from the frusto-conical wall onto the cylindrical wall so as to protrude radially from the cylindrical wall and within surface continuation of the frusto-conical wall, and a split ring expandably slidable on the frusto-conical wall and over said swaged metal protrusions in more contracted condition around said cylindrical wall.

2. A fastening device of stud and socket type for juxtaposed members to be clamped thereby, comprising a stud element including a stud and grommet thereon, said grommet comprising a hollow body having one end open and having a cross-wall at the other end, said grommet being frusto-conical and having a flange at its larger end, a series of longitudinally directed shoulders around said grommet spaced from said flange, and a split ring larger than the smaller end of said frusto-conical grommet and smaller than the larger end thereof adapted to be applied past said shoulders toward said flange and held from retraction away from the flange by engagement with said shoulders, said shoulders being circumferentially spaced around the grommet and constituted as burr ends of metal swaged from the outer surface of said grommet.

3. A fastening device of stud and socket type for juxtaposed members to be clamped thereby wherein said members have holes coaxially located for entry of said stud therein and of which the hole in one member is larger than the hole in the other member, comprising a stud element including a stud and a grommet thereon, said grommet comprising a sheet metal frusto-conical hollow body insertable through said holes of said members for a major portion of the length of said grommet and having its larger end open and having a cross-wall at the other end, said grommet having a flange at said open end too large to pass through the smaller of said member holes, said flange projecting radially outwardly in a plane perpendicular to the frusto-conical axis, said grommet being of one-piece sheet metal integral construction, and a snap ring of rectangular cross-section having an outer diameter less than the diameter of the larger hole of said one of said members and greater than the diameter of said smaller hole in the said other member and having a flat face for flatwise engagement with the margin of the hole of said other member and overlying the entire portion of said smaller hole outward from said grommet, said split ring also having a flat face at its side opposite from and parallel to the aforementioned flat face, and said grommet having shoulders engaging the second mentioned face opposing axial movement of said ring in the direction of said shoulders and with zero moments of force radially outward on said ring by said shoulders, said shoulders being circumferentially spaced around the grommet and constituted as burr ends of metal swaged from the outer surface of said grommet.

References Cited in the file of this patent

UNITED STATES PATENTS

| | | |
|---|---|---|
| 947,154 | Freeman | Jan. 18, 1910 |
| 2,100,816 | Purinton | Nov. 30, 1937 |
| 2,239,125 | Summers | Apr. 22, 1941 |
| 2,354,748 | Franklin | Aug. 1, 1944 |
| 2,378,122 | Barlow | June 12, 1945 |
| 2,392,718 | Baldwin | Jan. 8, 1946 |
| 2,428,077 | Herold | Sept. 30, 1947 |
| 2,533,115 | Huelster | Dec. 5, 1950 |
| 2,640,244 | Becker | June 2, 1953 |
| 2,691,199 | Schluster | Oct. 12, 1954 |
| 2,797,464 | Zahodiakin | July 2, 1957 |

FOREIGN PATENTS

| | | |
|---|---|---|
| 369,366 | Italy | Mar. 18, 1939 |
| 403,659 | Italy | May 4, 1943 |
| 428,898 | Great Britain | May 21, 1935 |